(12) United States Patent
Tiirola et al.

(10) Patent No.: US 12,464,369 B2
(45) Date of Patent: Nov. 4, 2025

(54) ADAPTIVELY CONFIGURING GUARD BANDS OF A COMMUNICATIONS CHANNEL OF A USER EQUIPMENT

(71) Applicant: Nokia Technologies Oy, Espoo (FI)

(72) Inventors: Esa Tapani Tiirola, Oulu (FI); Timo Erkki Lunttila, Espoo (FI); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 597 days.

(21) Appl. No.: 17/997,637

(22) PCT Filed: Apr. 30, 2021

(86) PCT No.: PCT/FI2021/050324
§ 371 (c)(1),
(2) Date: Oct. 31, 2022

(87) PCT Pub. No.: WO2021/229141
PCT Pub. Date: Nov. 18, 2021

(65) Prior Publication Data
US 2023/0224719 A1    Jul. 13, 2023

Related U.S. Application Data

(60) Provisional application No. 63/025,537, filed on May 15, 2020.

(51) Int. Cl.
*H04W 16/14* (2009.01)
*H04L 5/00* (2006.01)
*H04W 72/04* (2023.01)

(52) U.S. Cl.
CPC .......... *H04W 16/14* (2013.01); *H04L 5/0053* (2013.01); *H04W 72/04* (2013.01)

(58) Field of Classification Search
CPC ...... H04W 16/14; H04W 72/04; H04L 5/0053
See application file for complete search history.

(56) References Cited

U.S. PATENT DOCUMENTS

| 2014/0286269 A1* | 9/2014 | Stanwood ........... H04L 25/0226 370/329 |
| 2018/0049067 A1 | 2/2018 | He et al. |

(Continued)

FOREIGN PATENT DOCUMENTS

| EP | 3754892 A1 * | 12/2020 | ............ H04W 72/23 |
| WO | 2019/042291 A1 | 3/2019 | |

(Continued)

OTHER PUBLICATIONS

"New SID: Study on supporting NR from 52.6GHz to 71 Ghz", 3GPP TSG RAN Meeting #86, RP-193259, Agenda: 9.1.1, Intel Corporation, Dec. 9-12, 2019, 3 pages.

(Continued)

*Primary Examiner* — Michael J Moore, Jr.
(74) *Attorney, Agent, or Firm* — Nokia Technologies Oy

(57) ABSTRACT

A method of operating a user equipment (UE), the UE being included in a communications network, the communications network further including a base station, includes determining, by the UE, a wide channel; determining, by the UE, at least one sub-channel within the wide channel, a channel bandwidth (BW) of the at least one sub-channel being a first BW (S210); receiving a configuration of at least one DL or UL carrier, a channel BW of the at least one carrier being a second BW (S220); determining a first and last usable physical resource block (PRB) of the at least one sub-channel based on the first BW and the second BW (S230, S240); and performing at least one of transmitting data to, or receiving data from, the base station via the at least one DL carrier or UL carrier, using the at least one sub-channel.

20 Claims, 10 Drawing Sheets

(56) References Cited

U.S. PATENT DOCUMENTS

| | | | |
|---|---|---|---|
| 2018/0206271 A1* | 7/2018 | Chatterjee | H04L 5/0053 |
| 2019/0274162 A1 | 9/2019 | Zhang et al. | |
| 2020/0120720 A1 | 4/2020 | Wu et al. | |
| 2022/0150008 A1* | 5/2022 | Schober | H04L 5/0042 |
| 2023/0224719 A1* | 7/2023 | Tiirola | H04L 5/0092 |
| | | | 370/329 |

FOREIGN PATENT DOCUMENTS

| | | | | |
|---|---|---|---|---|
| WO | WO-2020165487 A1 * | 8/2020 | | H04L 5/0007 |
| WO | WO-2020242351 A1 * | 12/2020 | | H04W 72/541 |
| WO | WO-2021229141 A1 * | 11/2021 | | H04L 5/001 |

OTHER PUBLICATIONS

"3rd Generation Partnership Project; Technical Specification Group Radio Access Network; NR; Physical channels and modulation (Release 16)", 3GPP TS 38.211, V16.1.0, Mar. 2020, pp. 1-130.

"3rd Generation Partnership Project; Technical Specification Group Radio Access Network; NR; User Equipment (UE) radio transmission and reception; Part 2: Range 2 Standalone (Release 16)", 3GPP TS 38.101-2, V16.2.0, Dec. 2019, pp. 1-157.

"IEEE 802.11ad", Wikipedia, Retrieved on Nov. 1, 2022, Webpage available at : https://en.wikipedia.org/wiki/IEEE_802.11ad, 3 pages.

"IEEE 802.11ay", Wikipedia, Retrieved on Nov. 1, 2022, Webpage available at : https://en.wikipedia.org/wiki/IEEE_802.11ay, 3 pages.

"Required changes to NR using existing DL/UL NR waveform", 3GPP TSG RAN WG1 #101-e, R1-2003811, Agenda: 8.1.1, Nokia, May 25-Jun. 5, 2020, 22 pages.

International Search Report and Written Opinion received for corresponding Patent Cooperation Treaty Application No. PCT/FI2021/050324, dated Jul. 16, 2021, 15 pages.

"Remaining issues on WB operation in NR-U", 3GPP TSG RAN WG1 Meeting #100b, R1-2002226, Agenda: 7.2.2.2.5, Nokia, Apr. 20-30, 2020, 9 pages.

"The NR-U channel raster and allowed intra-cell GB for wideband operation", TSG-RAN Working Group 4 (Radio) meeting #94-e, R4-2001319, Agenda: 8.1.1.2, Ericsson, Feb. 20-Mar. 6, 2020, 6 pages.

"Summary on wide-band operation for NR-U", 3GPP TSG RAN WG1 #98bis, R1-1910824, Agenda: 7.2.2.2.5, LG Electronics, Oct. 14-20, 2019, 17 pages.

Partial European Search Report received for corresponding European Patent Application No. 21804159.8, dated May 22, 2024, 12 pages.

Extended European Search Report received for corresponding European Patent Application No. 21804159.8, dated Aug. 12, 2024, 12 pages.

* cited by examiner

| μ | Subcarrier spacing [kHz] | Max BW with 4k FFT [MHz] | Slot length [μs] | Symbol length w/o CP [μs] | Nominal CP length [ns] |
|---|---|---|---|---|---|
| 0 | 15 | 50 | 1000 | 66.67 | 4688 |
| 1 | 30 | 100 | 500 | 33.33 | 2343 |
| 2 | 60 | 200 | 250 | 16.67 | 1172 |
| 3 | 120 | 400 | 125 | 8.33 | 586 |
| 4 | 240 | 800 | 62.5 | 4.17 | 293 |
| 5 | 480 | 1600 | 31.25 | 2.08 | 147 |
| 6 | 960 | 3200 | 15.625 | 1.04 | 73 |
| 7 | 1920 | 6400 | 7.8125 | 0.52 | 37 |

FR1: μ=0,1
FR2: μ=2,3
>52.6 GHz: μ=4,5,6,7

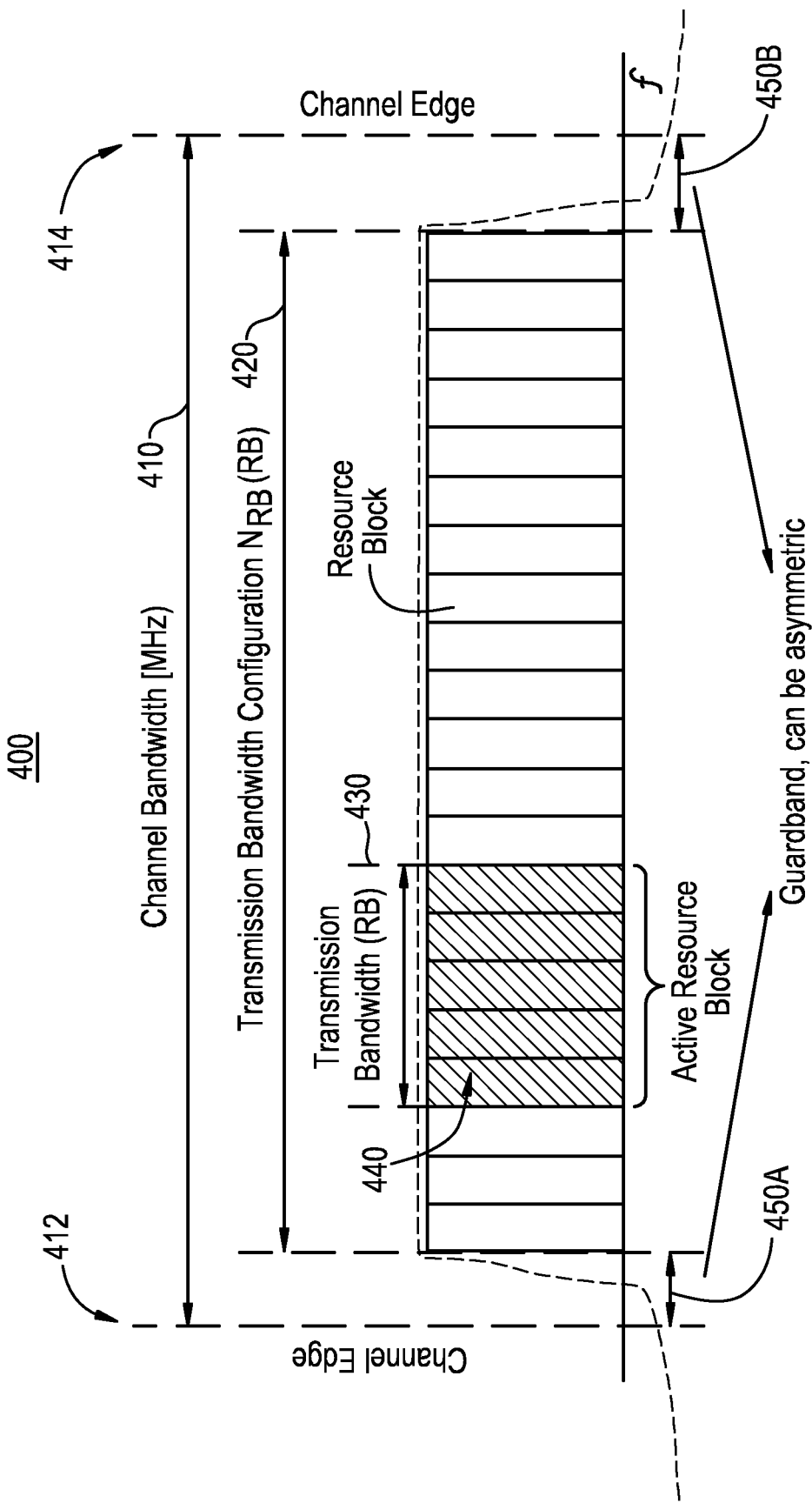

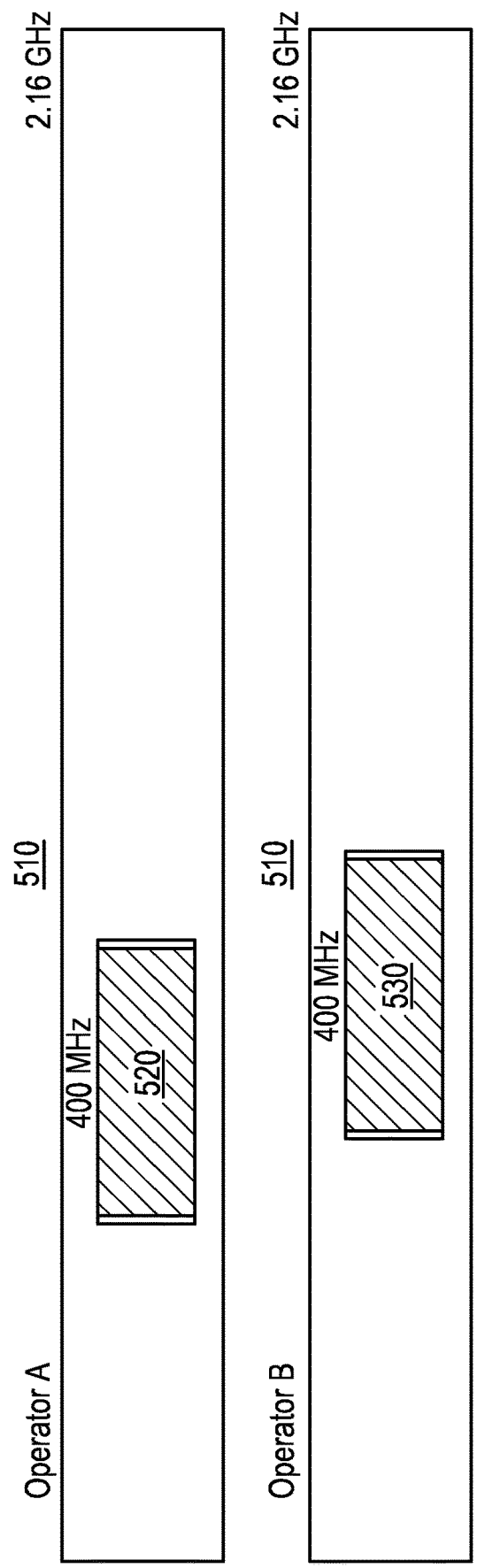
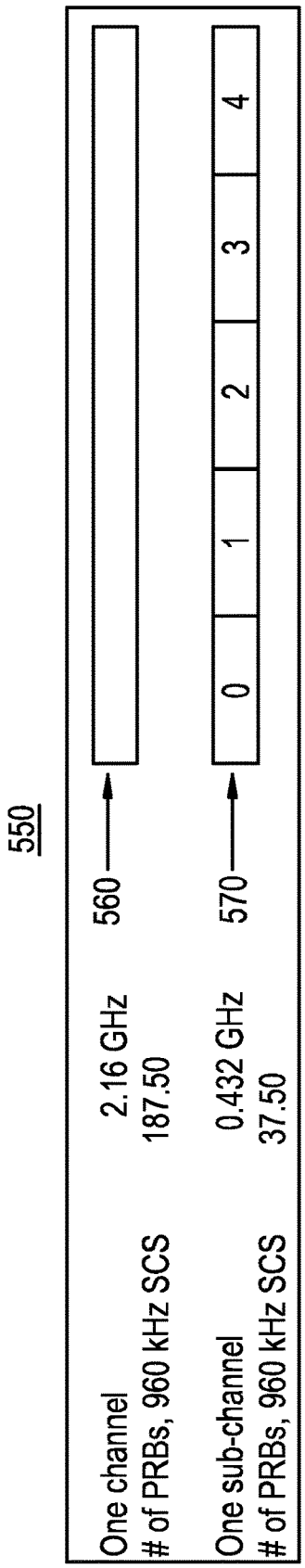

FIG. 7

| SCS (kHz) | PRBs | BW | Channel BW (MHz) | Spectrum usage% |
|---|---|---|---|---|
| 960 | 33 | 380.16 | 400 | 95.0% |
| 480 | 66 | 380.16 | 400 | 95.0% |
| 240 | 132 | 380.16 | 400 | 95.0% |
| 120 | 264 | 380.16 | 400 | 95.0% |
| SCS (kHz) | PRBs | BW | Channel BW | Spectrum usage% |
| 1920 | 33 | 760.32 | 800 | 95.0% |
| 960 | 66 | 760.32 | 800 | 95.0% |
| 480 | 132 | 760.32 | 800 | 95.0% |
| 240 | 264 | 760.32 | 800 | 95.0% |
| SCS (kHz) | PRBs | BW | Channel BW | Spectrum usage% |
| 3840 | 24 | 1105.92 | 1200 | 92.2% |
| 1920 | 48 | 1105.92 | 1200 | 92.2% |
| 960 | 99 | 1140.48 | 1200 | 95.0% |
| 480 | 198 | 1140.48 | 1200 | 95.0% |
| SCS (kHz) | PRBs | BW | Channel BW | Spectrum usage% |
| 3840 | 33 | 1520.64 | 1600 | 95.0% |
| 1920 | 66 | 1520.64 | 1600 | 95.0% |
| 960 | 132 | 1520.64 | 1600 | 95.0% |
| 480 | 264 | 1520.64 | 1600 | 95.0% |

800

| # of sub bands (n) | SCS (kHz) | PRBs | BW | Channel BW (MHz) | Spectrum usage% | GB (kHz) |
|---|---|---|---|---|---|---|
| 1 | 960 | 36 | 414.72 | 432 | 96.0% | 8640 |
| 1 | 480 | 72 | 414.72 | 432 | 96.0% | 8640 |
| 1 | 240 | 144 | 414.72 | 432 | 96.0% | 8640 |
| 1 | 120 | 275 | 396 | 432 | 91.7% | 18000 |
| # of sub bands (n) | SCS (kHz) | PRBs | BW | Channel BW (MHz) | Spectrum usage% | GB (kHz) |
| 2 | 1920 | 36 | 829.44 | 864 | 96.0% | 17280 |
| 2 | 960 | 72 | 829.44 | 864 | 96.0% | 17280 |
| 2 | 480 | 144 | 829.44 | 864 | 96.0% | 17280 |
| 2 | 240 | 275 | 792 | 864 | 91.70% | 36000 |
| # of sub bands (n) | SCS (kHz) | PRBs | BW | Channel BW (MHz) | Spectrum usage% | GB (kHz) |
| 3 | 3840 | 27 | 1244.16 | 1296 | 96.0% | 25920 |
| 3 | 1920 | 54 | 1244.16 | 1296 | 96.0% | 25920 |
| 3 | 960 | 108 | 1244.16 | 1296 | 96.0% | 25920 |
| 3 | 480 | 216 | 1244.16 | 1296 | 96.0% | 25920 |
| # of sub bands (n) | SCS (kHz) | PRBs | BW | Channel BW (MHz) | Spectrum usage% | GB (kHz) |
| 4 | 3840 | 36 | 1658.88 | 1728 | 96.0% | 34560 |
| 4 | 1920 | 72 | 1658.88 | 1728 | 96.0% | 34560 |
| 4 | 960 | 144 | 1658.88 | 1728 | 96.0% | 34560 |
| 4 | 480 | 275 | 1584 | 1728 | 91.7% | 72000 |
| # of sub bands (n) | SCS (kHz) | PRBs | BW | Channel BW (MHz) | Spectrum usage% | GB (kHz) |
| 5 | 3840 | 45 | 2073.6 | 2160 | 96.0% | 43200 |
| 5 | 1920 | 90 | 2073.6 | 2160 | 96.0% | 43200 |
| 5 | 960 | 180 | 2073.6 | 2160 | 96.0% | 43200 |

FIG. 8

ADAPTIVELY CONFIGURING GUARD BANDS OF A COMMUNICATIONS CHANNEL OF A USER EQUIPMENT

RELATED APPLICATION

This application was originally filed as PCT Application No. PCT/FI2021/050324 on Apr. 30, 2021, which claims priority from U.S. Provisional Application No. 63/025,537, filed on May 15, 2020, each of which is incorporated herein by reference in its entirety.

TECHNICAL FIELD

One or more example embodiments relate generally to wireless communications and, more specifically, to the Third Generation Partnership Project (3GPP) New Radio (NR) physical layer.

BACKGROUND

Fifth generation (5G) wireless communications networks are the next generation of mobile communications networks. Standards for 5G communications networks are currently being developed by the Third Generation Partnership Project 3GPP. These standards are known as 3GPP NR or 5G NR standards.

RF communication may be regulated by a government entity such that the government entity controls which parties may use which frequency bands for communication. For example, in the US, the government has defined certain portions of the radio spectrum as being part of a licensed band while defining other portions of the radio spectrum as being part of an unlicensed band. Licensed bands are bands including radio frequencies which require an entity to obtain a license from the government before using the radio frequencies for communication. To the contrary, an entity may not require a special license to use radio frequencies within an unlicensed band for communications. In the US, an example of an unlicensed band is the 60 GHz band (i.e., 57-71 GHz).

SUMMARY

According to at least some example embodiments, a method of operating a user equipment (UE), the UE being included in a communications network, the communications network further including a base station, includes determining, by the UE, a wide channel; determining, by the UE, at least one sub-channel within the wide channel, a channel bandwidth (BW) of the at least one sub-channel being a first BW; receiving a configuration of at least one DL or UL carrier, a channel BW of the at least one carrier being a second BW; determining a first and last usable PRB of the at least one sub-channel based on the first BW and the second BW by setting first and last useable physical resource blocks (PRBs) of the at least one sub channel based on a first pair of GBs, if a size of the second BW is equal to a size of the first BW, and setting the first and last useable PRBs of the at least one sub-channel based on a second pair of GBs, if the size of a second BW is less than the size of the first BW, a size of a total bandwidth of the second pair of GBs being greater than a size of a total bandwidth of the first pair of GBs; and performing at least one of transmitting data to, or receiving data from, the base station via the at least one DL carrier or UL carrier, using the at least one sub-channel.

The size of a BW of the wide channel may be 2.16 GHz.

The size of the first BW may be n*432 MHz, wherein n is an integer 1.

A total number of sub-channels included in the wide channel may be five.

The size of the second BW may be at least one of 100 MHz and n*400 MHz wherein n is an integer ≥1.

The method may further include obtaining, by the UE, a third pair of guard bands (GBs) and determining, by the UE, a maximum number of PRBs of the at least one DL or UL carrier based on the third pair of guard bands.

The second BW may be n*432 MHz or n*400 MHz, wherein n is an integer ≥1, and the at least one carrier occupies at maximum n adjacent sub-channels.

The UE may support at least two contiguous carriers and each carrier may be confined within n adjacent sub-channels.

The UE may be capable of operating according to both the first pair and the second pair of GBs, and the method may further include performing, by the UE, an initial access according to the second pair of GBs; and subsequent to initial access, receiving, by the UE, a radio resource control (RRC) message from the base station to start operating according to the first pair of GBs.

The UE may be capable of operating according to only the second pair of GBs and the UE may determine the first usable PRB based on a broadcasted system information block (SIB).

The base station may be a next generation Node B (gNB).

According to at least some example embodiments, a method of operating a base station of a communications network, the communications network further including at least a first user equipment (UE) operating in a first mode and at least a second UE operating in a second mode, includes configuring at least a first sub-channel, from among sub-channels of a wide channel, with a first channel configuration for at least one of transmitting downlink (DL) data to, or receiving UL data from, at least the first UE; configuring at least a second sub-channel, from among the sub-channels of the wide channel, with a second channel configuration for at least one of transmitting DL data to, or receiving UL data from, at least the second UE; and performing at least one of transmitting DL data to at least the first UE using at least the first sub-channel, receiving UL data from at least the first UE using at least the first sub-channel, transmitting DL data to at least the second UE using at least the second sub-channel, or transmitting UL data to at least the second UE using at least the second sub-channel, wherein, the first channel configuration includes a first plurality of physical resource blocks (PRBs) between a first guard band (GB) and a second GB, the second channel configuration includes a second plurality of PRBs between a third GB and a fourth GB, a total number of PRBs in the second plurality of PRBs is less than a total number of PRBs in the first plurality of PRBs, and each PRB in the second plurality of PRBs is aligned with a corresponding PRB in the first plurality of PRBs with respect to frequency.

The size of a bandwidth (BW) of the wide channel may be 2.16 GHz.

The size of a bandwidth (BW) of the first sub-channel may be 432 MHz.

A total number of sub-channels included in the wide channel may be five.

A size of a bandwidth (BW) of the second sub-channel may be at least one of 100 MHz and 400 MHz.

The base station may support at least first and second carriers and the first and second carriers may be confined to the first and second sub-channels.

The at least first and second carriers may operate according to a common PRB grid.

The base station may be a next generation Node B (gNB).

According to at least some example embodiments, a user equipment (UE) includes a processor; and memory storing computer-executable instructions that, when executed by the processor, causes the UE to perform operations including determining, by the UE, a wide channel; determining, by the UE, at least one sub-channel within the wide channel, a channel bandwidth (BW) of the at least one sub-channel being a first BW; receiving a configuration of at least one DL or UL carrier, a channel BW of the at least one carrier being a second BW; determining a first and last usable PRB of the at least one sub-channel based on the first BW and the second BW by setting first and last useable physical resource blocks (PRBs) of the at least one sub channel based on a first pair of GBs, if a size of the second BW is equal to a size of the first BW, and setting the first and last useable PRBs of the at least one sub-channel based on a second pair of GBs, if the size of a second BW is less than the size of the first BW, a size of a total bandwidth of the second pair of GBs being greater than a size of a total bandwidth of the first pair of GBs; and performing at least one of transmitting data to, or receiving data from, a network element via the at least one DL carrier or UL carrier.

According to at least some example embodiments, a base station includes a processor; and memory storing computer-executable instructions that, when executed by the processor, cause the base station to perform operations including configuring at least a first sub-channel, from among sub-channels of a wide channel, with a first channel configuration for at least one of transmitting downlink (DL) data to, or receiving DL data from, at least a first UE configured to operate in a first mode; configuring at least a second sub-channel, from among the sub-channels of the wide channel, with a second channel configuration for at least one of transmitting DL data to, or receiving UL data from, at least a second UE configured to operate in a second mode; and performing at least one of transmitting DL data to at least the first UE using at least the first sub-channel, receiving UL data from at least the first UE using at least the first sub-channel, transmitting DL data to at least the second UE using at least the second sub-channel, or transmitting UL data to at least the second UE using at least the second sub-channel, wherein, the first channel configuration includes a first plurality of physical resource blocks (PRBs) between a first guard band (GB) and a second GB, the second channel configuration includes a second plurality of PRBs between a third GB and a fourth GB, a total number of PRBs in the second plurality of PRBs is less than a total number of PRBs in the first plurality of PRBs, and each PRB in the second plurality of PRBs is aligned with a corresponding PRB in the first plurality of PRBs with respect to frequency.

According to at least some example embodiments, a user equipment (UE) includes means for determining, by the UE, a wide channel; means for determining, by the UE, at least one sub-channel within the wide channel, a channel bandwidth (BW) of the at least one sub-channel being a first BW; means for receiving a configuration of at least one DL or UL carrier, a channel BW of the at least one carrier being a second BW; means for determining a first and last usable PRB of the at least one sub-channel based on the first BW and the second BW by setting first and last useable physical resource blocks (PRBs) of the at least one sub channel based on a first pair of GBs, if a size of the second BW is equal to a size of the first BW, and setting the first and last useable PRBs of the at least one sub-channel based on a second pair of GBs, if the size of a second BW is less than the size of the first BW, a size of a total bandwidth of the second pair of GBs being greater than a size of a total bandwidth of the first pair of GBs; and means for performing at least one of transmitting data to, or receiving data from, a network element via the at least one DL carrier or UL carrier.

According to at least some example embodiments, a base station includes means for configuring at least a first sub-channel, from among sub-channels of a wide channel, with a first channel configuration for at least one of transmitting downlink (DL) data to, or receiving DL data from, at least a first UE configured to operate in a first mode; means for configuring at least a second sub-channel, from among the sub-channels of the wide channel, with a second channel configuration for at least one of transmitting DL data to, or receiving UL data from, at least a second UE configured to operate in a second mode; and means for performing at least one of transmitting DL data to at least the first UE using at least the first sub-channel, receiving UL data from at least the first UE using at least the first sub-channel, transmitting DL data to at least the second UE using at least the second sub-channel, or transmitting UL data to at least the second UE using at least the second sub-channel, wherein, the first channel configuration includes a first plurality of physical resource blocks (PRBs) between a first guard band (GB) and a second GB, the second channel configuration includes a second plurality of PRBs between a third GB and a fourth GB, a total number of PRBs in the second plurality of PRBs is less than a total number of PRBs in the first plurality of PRBs, and each PRB in the second plurality of PRBs is aligned with a corresponding PRB in the first plurality of PRBs with respect to frequency.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 3 illustrates (3GPP) New Radio (NR) Release 15 (Rel-15) numerology candidates frequencies above 52.6 GHz.

FIG. 4 Illustrates examples of a channel bandwidth and a transmission bandwidth configuration for one NR channel.

FIG. 5A illustrates a coexistence scenario in which two operators are using 400 MHz sub-channels at respectively different positions within a wide channel having a bandwidth of 2.16 GHz.

FIG. 5B illustrates a relationship between a 2.16 GHz bandwidth (BW) wide channel and multiple 400 MHz BW sub-channels according to at least some example embodiments.

FIG. 7 illustrates an example transmission (Tx) BW configuration for Mode 2.

FIG. 8 illustrates an example Tx BW configuration for Mode 1.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Figure 1:
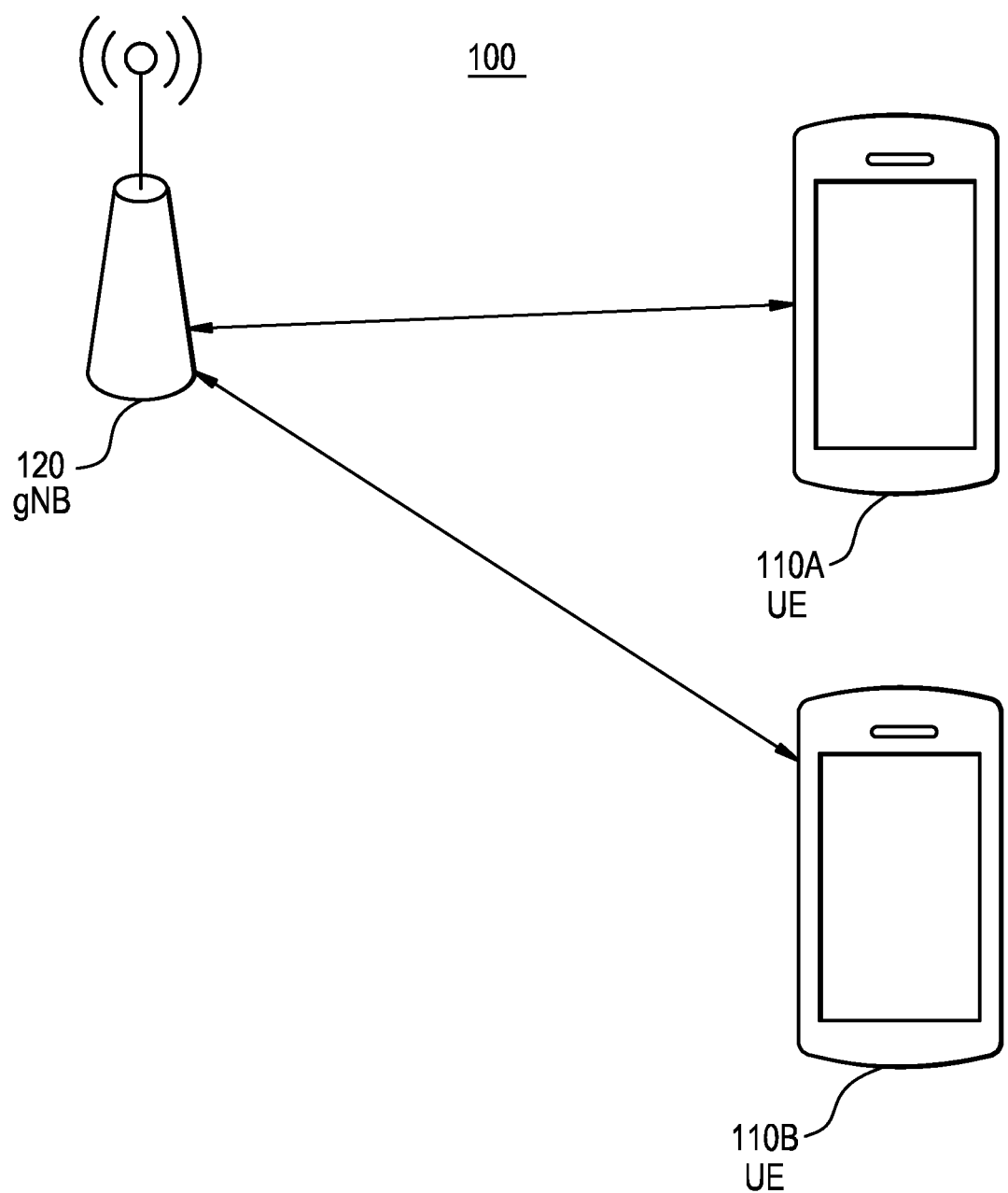
FIG. 1 is a diagram illustrating a portion of a communications network according to at least some example embodiments.

FIG. 1 is a diagram illustrating a portion of a communications network 100 according to at least some example embodiments. As is illustrated in FIG. 1, the communications network 100 includes next generation radio access network (NG-RAN) and Third Generation Partnership Project (3GPP) 5G New Radio (NR) radio access technology. For example, referring to FIG. 1, communications network 100 includes a first user equipment (UE) 110A, a second UE 110B and a next generation Node B (gNB) 120. According to at least some example embodiments, Further, though not illustrated, communications network 100 may further include 5G core (5GC) network elements and may be a part of a 5G system (5GS). For example, the gNB 120 may be connected to an access and mobility management function (AMF) element. Additionally, though not illustrated, the communications network 100 may further include long-term evolution (LTE) network elements that are connected to one or more of the gNB 120, the first UE 110A and the second UE 110B. Examples of such LTE elements include, but are not limited to, LTE radio access technology (RAT) network elements (e.g., evolved universal mobile telecommunications system (UMTS) terrestrial radio access network (E-UTRAN) network elements) such as evolved node Bs (eNBs), and LTE core network elements (e.g., evolved packet core (EPC) network elements) such as mobility management entities (MMEs). An example structure which may be used to embody one or more radio network elements (e.g., gNBs, UEs, etc.) of the communications network 100 will now be discussed below with respect to FIG. 2.

Further, according to at least some example embodiments, communications network 100 may implement integrated access and backhaul (IAB) technology by including one or more IAB nodes. Communications network 100 may also include one or more donor gNBs. IAB technology supports wireless relaying in NG-RAN. According to at least some example embodiments, a DU of an IAB node may perform any operations described in the present disclosure as being performed by a gNB. Further, according to at least some example embodiments, a mobile termination (MT) part of an IAB node may perform any operations described in the present disclosure as being performed by a UE.

Figure 2:
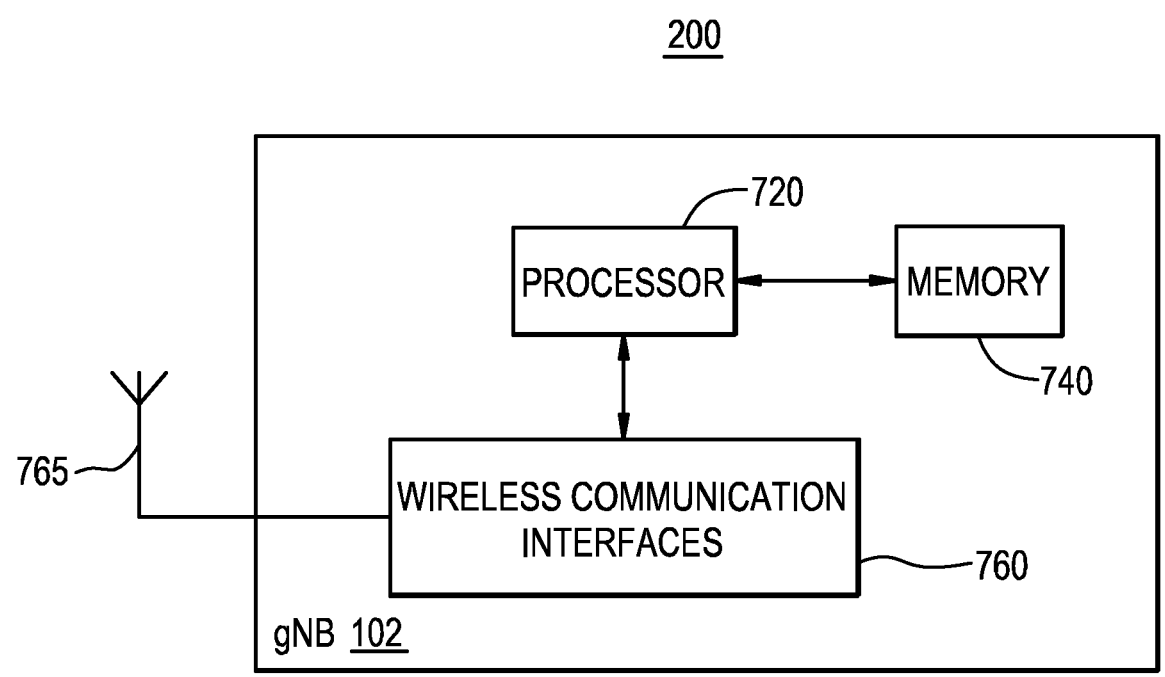
FIG. 2 illustrates an example embodiment of a radio network element.

FIG. 2 illustrates an example embodiment of a radio network element. In the example illustrated in FIG. 2, the radio network element is a gNB (i.e., gNB 102).

As shown, the gNB 102 includes: a memory 740; a processor 720 connected to the memory 740; various interfaces 760 connected to the processor 720; and one or more antennas or antenna panels 765 connected to the various interfaces 760. The various interfaces 760 and the antenna 765 may constitute a transceiver for transmitting/receiving data to/from a UE, a gNB, and/or other radio network element via a plurality of wireless beams. According to example embodiments, the memory 740, processor 720, and interfaces 760, collectively, are an example of a central unit (CU) of the gNB 102, and the one or more antennas or antenna panels 765 are an example of a distributed unit (DU) or DUs of the gNB 102.

As will be appreciated, depending on the implementation of the gNB 102, the gNB 102 may include many more components than those shown in FIG. 2. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the gNB (e.g., functionalities of a gNB, methods according to example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the one or more antennas 765, or other input/output components. As will be understood, the various interfaces 760 and programs stored in the memory 740 to set forth the special purpose functionalities of the gNB 102 will vary depending on the implementation of the gNB 102.

The interfaces 760 may also include one or more user input devices (e.g., a keyboard, a keypad, a mouse, or the like) and user output devices (e.g., a display, a speaker, or the like).

Further, though the radio network element of FIG. 2 is illustrated as a gNB, other network elements (e.g., UEs, other radio access and backhaul network elements, central units (CUs), eNBs, ng-eNBs, or the like) may also have the structure of the network element illustrated in FIG. 2. In this regard, for example, the memory 740 may store an operating system and any other routines/modules/applications for providing the functionalities of the IAB nodes, donor gNBs, UEs, etc. (e.g., functionalities of these elements, methods according to the example embodiments, etc.) to be executed by the processor 720. For example, the first UE 110A and/or the second UE 110B may be embodied by the network element illustrated in FIG. 2, in which case the memory 740 stores computer-executable instructions that, when executed by the processor 720, cause the processor 720 to perform the operations described in the present disclosure as being performed by the first UE 110A, the second UE 110B and/or the gNB 120.

Table 1, below, provides a list of a number of abbreviations used in the present specification:

TABLE 1

| | |
|---|---|
| BW | Bandwidth |
| BWP | Bandwidth part |
| CP | Cyclic Prefix |
| EIRP | Effective Isotropic Radiated Power |
| FFT | Fast Fourier Transform |
| FR2 | Frequency range 2 (Frequency range 24.25 GHz-52.6 GHz) |
| GB | Guard Band |
| LBT | Listen Before Talk |
| PRB | Physical Resource Block |
| RF | Radio Frequency |
| RX | Reception |
| SCS | Subcarrier Spacing |
| SIB | System Information Block |
| SIB1 | System Information Block Type 1 |
| TX | Transmission |
| UE | User equipment |

1. NR Numerology & Time-Frequency Scaling

Support for multiple numerologies is one of the basic features in NR. Table 2, below, captured in 3GPP technical specification (TS) 38.211 shows the transmission numerologies supported by Rel-15 NR. It is known that larger subcarrier spacing $\Delta f$ leads to:

larger carrier bandwidth for a given FFT size,
smaller symbol duration and potentially lower latency,
reduced sensitivity to phase noise, and
reduced CP length (for a given CP overhead).

TABLE 2

| $\mu$ | $\Delta f = 2^\mu \cdot 15 \text{[kHz]}$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR Rel-15 utilizes time-frequency scaling with respect to LTE numerology (where SCS=15 kHz)

Scaling is characterized by a scaling factor $2^\mu$

Scaling decreases the time domain properties (such as slot/OFDM symbol/CP length) by a factor of $2^\mu$, and increases the frequency domain properties (such as subcarrier spacing and PRB size in frequency) by a factor of $2^\mu$ 2. Support for Wider BW & Phase Noise Mitigation NR Rel-15 supports BWP sizes up to 275 PRBs. This means that the maximum BWP size according to NR Rel-15 is 396 MHz (0.12 MHz*12*275). This may not be sufficient for scenarios above 52.6 GHz where aggregated system bandwidth can be as high as 14 GHz (57-71 GHz). Additionally, phase noise will also be increased at higher frequencies. Thus, it may be beneficial to introduce larger subcarrier spacings to tackle phase noise, and to provide larger carrier bandwidth with reasonable FFT size. This can be achieved by extending the numerology scaling framework defined in NR Rel-15 to support additional values for $\mu$ e.g. according to table 300 of FIG. 3. FIG. 3 illustrates table 300 which includes example 3GPP NR Rel-15 numerology candidates for frequencies above 52.6 GHz.

Table 300 defines an example relationship between $\mu$ values 310, SCS values 320, maximum bandwidth values 330, slot length values 340, symbol length (without CP values) 350, and nominal CP length values 360.

3. Configuration of Channel Bandwidth in FR2

Configuration of channel bandwidth in FR2 will be explained with reference to FIG. 4. FIG. 4 Illustrates examples of a channel bandwidth and a transmission bandwidth configuration for one NR channel. Specifically, FIG. 4 illustrates an example channel configuration 400 of one NR channel. As is illustrated in FIG. 4, the example channel configuration 400 has a channel bandwidth 410 defined by first and second channel edges 412 and 414. Further, a transmission bandwidth configuration NRB 420 defines the outer bounds of resource blocks (RBs) of the channel configuration 400. For example, the outer bounds can be defined by indicating first usable RB and last usable RB or carrier size in number of RBs. Within transmission bandwidth configuration NRB 420 that may correspond to bandwidth configuration of a carrier, transmission bandwidth 430 defines active resource blocks 440 from among the resource blocks of transmission bandwidth configuration NRB 420 and may correspond to configuration of a bandwidth part. As is also illustrated in FIG. 4, the transmission bandwidth configuration NRB 420 is separated from the first and second channel edges 412 and 414 by first and second guard bands 450A and 450B, respectively. Additionally, as is shown in FIG. 4, a channel configuration may include guard bands that are not equal in size. For example, in the example illustrated in FIG. 4, the second guard band 450B has a greater bandwidth than the first guard band 450A. Configuration of channel bandwidth in FR2 will now be discussed further below.

3GPP TS 38.101-2 defines the bandwidth-related aspects for an FR2 scenario.

Channel configuration 400 of FIG. 4 shows how channel bandwidth, Tx BW configuration, Tx BW and guard bands are related to each other.

Table 3, below, shows the supported BW options, and maximum numbers of PRBs supported for different subcarrier spacing values such that transmission BW configuration maintains the minimum guard bands.

Table 4, below, shows relatively low or, alternatively, minimum guard band sizes for each UE channel bandwidth and SCS.

TABLE 3

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

TABLE 4

| SCS (kHz) | 50 MHz | 100 MHz | 200 MHz | 400 MHz |
|---|---|---|---|---|
| 60 | 1210 | 2450 | 4930 | N. A |
| 120 | 1900 | 2420 | 4900 | 9860 |

Table 5, below, defines the carrier aggregation bandwidth classes supported by the UE. However minimum GB requirements are generally defined per component carrier (CC).

TABLE 5

| NR CA bandwidth class | Aggregated channel bandwidth | Number of contiguous CC | Fallback group |
|---|---|---|---|
| A | $BW_{Channel} \leq 400$ MHz | 1 | 1, 2, 3, 4 |
| B | 400 MHz < $BW_{Channel\_CA} \leq$ 800 MHz | 2 | 1 |
| C | 800 MHZ < $BW_{Channel\_CA} \leq$ 1200 MHz | 3 | |
| D | 200 MHZ < $BW_{Channel\_CA} \leq$ 400 MHz | 2 | 2 |
| E | 400 MHZ < $BW_{Channel\_CA} \leq$ 600 MHz | 3 | |
| F | 600 MHZ < $BW_{Channel\_CA} \leq$ 800 MHz | 4 | |
| G | 100 MHz < $BW_{Channel\_CA} \leq$ 200 MHz | 2 | 3 |
| H | 200 MHZ < $BW_{Channel\_CA} \leq$ 300 MHz | 3 | |
| I | 300 MHZ < $BW_{Channel\_CA} \leq$ 400 MHz | 4 | |
| J | 400 MHZ < $BW_{Channel\_CA} \leq$ 500 MHz | 5 | |
| K | 500 MHZ < $BW_{Channel\_CA} \leq$ 600 MHz | 6 | |
| L | 600 MHZ < $BW_{Channel\_CA} \leq$ 700 MHz | 7 | |
| M | 700 MHZ < $BW_{Channel\_CA} \leq$ 800 MHz | 8 | |
| O | 100 MHZ $\leq BW_{Channel\_CA} \leq$ 200 MHz | 2 | 4 |
| P | 150 MHZ $\leq BW_{Channel\_CA} \leq$ 300 MHz | 3 | |
| Q | 200 MHZ $\leq BW_{Channel\_CA} \leq$ 400 MHz | 4 | |

With reference to Table 5, it should be noted that, maximum supported component carrier bandwidths for fallback groups 1, 2, 3 and 4 are 400 MHz, 200 MHz, 100 MHz and 100 MHz respectively except for CA bandwidth class A.

It should also be noted that it is mandatory for a UE to be able to fallback to lower order CA bandwidth class configuration within a fallback group. It is not mandatory for a UE to be able to fallback to lower order CA bandwidth class configuration that belong to a different fallback group.

Examples of technological problems associated with implementing NR on the 2.16 GHz wide 60 GHz band will now be discussed in greater detail below.

4. Example Technological Problems

Institute of electrical and electronics engineers (IEEE) 802.11ad/ay (aka WiGig) systems currently support multiples of 2.16 GHz blocks (channels) in unlicensed spectrum (57-71 GHz). In order to optimize coexistence between WiGig and NR, it makes sense to consider 2.16 GHz as the baseline channelization also for NR at or above 52.6 GHz.

One of the basic features of NR is variable bandwidth operation (in contrary to WiGig, where channel bandwidth is fixed to multiples of 2.16 GHz). It may be beneficial for partial bandwidth operation within a 2.16 GHz channel to be enabled. A natural starting point, based on NR defined for FR2, would be to support 400 MHz transmission bandwidth as a bandwidth option for the 60 GHz spectrum scenario.

FIG. 5A illustrates a coexistence scenario in which two operators, Operator A and Operator B, are using 400 MHz sub-channels 520 and 530, respectively. As is illustrated in FIG. 5A, 400 MHz sub-channels 520 and 530 are located at respectively different points within a 2.16 GHz wide channel 510. In the example illustrated in FIG. 5A, both operators are applying NR. It will be appreciated that partial overlap of different operators' channels, such as shown in FIG. 1, should be avoided by proper system design:

For example, in contrast to scenarios where interfering nodes are fully non-overlapping with respect to each other, partial overlap of nodes will worsen the performance (e.g., Tx/Rx performance) due to uncorrelated interference between overlapping and non-overlapping parts.

Further, full frequency domain flexibility makes it more difficult for gNBs and UEs to coordinate and avoid partial overlap.

In light of the above-referenced technological problems associated with implementing NR on the 2.16 GHz wide unlicensed 60 GHz band the following questions should be considered:

How can smooth coexistence between different bandwidth capabilities (of different NR devices) on a 2.16 GHz channel be facilitated?

What are ways to support smooth evolution of FR2 design (e.g., based on n*400 MHz) towards more efficient n*432 MHz based operation in the proposed coexistence scenario?

5. Example Technological Solutions

In order to address and/or mitigate the above-referenced technological problems arising from attempting to implement NR on the unlicensed 60 GHz band, as discussed above, it may be beneficial to employ a new arrangement for narrowband operation at the 60 GHz band. For example, with respect to the new arrangement, a 2.16 GHz channel may be split into N sub-channels of equal size. According to at least one example embodiment, N is defined to be 5. However, N is not limited to 5. For example, N may be set or predefined to be to any (e.g., 4, 6 10, 15, less than 5, greater than 20, etc.) number based on preferences of an owner and/or operator of communications network 100. A value of N may be also determined by the standardization body, such as 3GPP. Further, according to at least one example embodiment, a sub-channel size may be set to 2160 MHz/5=432 MHz. According to at least one example embodiment, a sub-channel size of 432 MHz corresponds to 37.5 PRBs with 960 kHz subcarrier spacing (432 MHz/(12*0.96 MHz)). Further the 2.16 GHz wide band corresponds to 187.5 PRBs.

An example of the above-referenced arrangement is illustrated in FIG. 5B. FIG. 5B illustrates a relationship between a 2.16 GHz BW channel 560 and a group of five 400 MHz BW sub-channels 570, according to at least some example embodiments. As is illustrated in FIG. 5B, the single 2.16 BW channel 560 has the same total size as all five of 432 MHz channels 570.

According to at least some example embodiments, two operation modes (which may also be referred to as bandwidth capabilities) are defined for the UE:

Mode 1: Operation according to one or multiple sub-channels, e.g. n*432 MHz (or in more generic terms, n*2160 MHz/N), where n=a number of sub-channels on a 2.16 GHz channel.

A simple terminal may support, for example, only one sub-channel, while more advanced (e.g., later) terminals can support two or more sub-channels.

Mode 2: Operation according to a sub-channel size of X MHz.

X can be one of the existing BW capabilities defined for FR2 (e.g., [50, 100, 200, 400] MHz).

X can be also a multiple of an existing BW capability defined for FR2, e.g. m*400 MHz (m∈[2,3,4]).

UEs may also support carrier aggregation of two or more carriers, each carrier having a bandwidth of X MHz.

This mode is targeted for some older or lower cost terminals.

Figure 6:
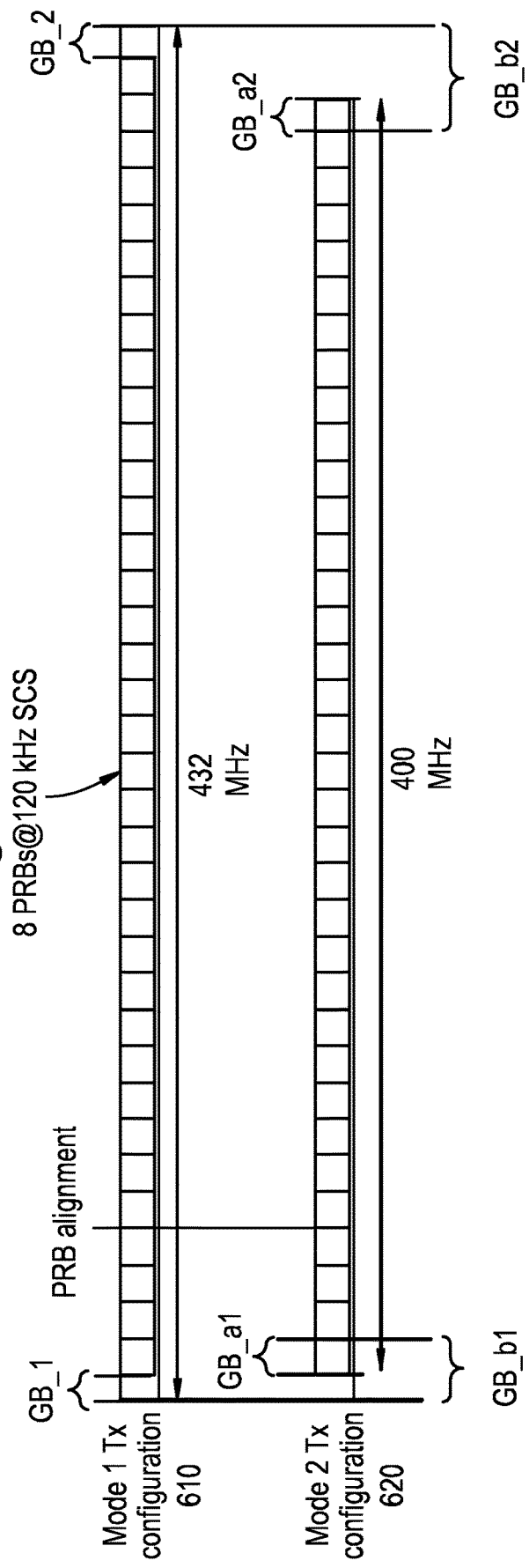
FIG. 6 illustrates a relationship between two different operation modes, Mode 1 and Mode 2, according to at least some example embodiments.

FIG. 6 illustrates a relationship between two different operation modes, Mode 1 and Mode 2, according to at least some example embodiments. FIG. 6 illustrates Mode 1 and Mode 2 in operation using one 432 MHz sub-channel. Though, for the purpose of simplicity, FIG. 6 includes only a single 432 MHz sub-channel and a single 400 MHz sub-channel to explain a relationship between Mode 1 and Mode 2, the logic holds also for the case of multiple (432 MHz) sub-channels. For example, according to at least some example embodiments, the relationships illustrated in FIG. 6 with reference to single sub-channel may also apply to a plurality of sub-channels.

FIG. 6 illustrates Mode 1 Tx configuration 610 and Mode 2 Tx configuration 620. Mode 1 corresponds to a traditional approach where the Tx BW configuration (i.e. number of PRBs & guard bands GB_1 and GB_2) is defined for a certain carrier BW, such as a 432 MHz carrier (or n*432 MHz). Mode 2 provides a smooth evolution path based on FR2 bandwidth options. A Tx BW configuration is determined according to 400 MHz (as example). Determining the Tx BW in this manner may involve determining the maximum number of transmitted/received PRBs according to a 400 MHz channel bandwidth, as well as determining the sizes and locations of lower and upper guard bands (i.e., guard bands GB_a1, GB_a2), according to the minimum guard bands defined for a 400 MHz carrier. According to at least one example embodiment, the minimum guard band sizes are defined separately for each SCS option.

As is illustrated in FIG. 6, additional guard bands related to Mode 2 operation (i.e., guard bands GB_b1, GB_b2) correspond to GBs within the 432 MHz sub-channel. A UE may assume that the gNB configures GB_b1 and GB_b2 so that the carrier's location within the sub-channel meets the requirements set for operation on that (e.g. 432-MHz) sub-channel (or sub-channels). It can be noted that at least in certain embodiments, the additional guard band does not create additional implementation/testing burden for UE.

According to at least some example embodiments, GBs GB_b1, GB_b2, GB_1, and GB_2 are determined according to the same minimum guard band requirement defined for certain SCSs.

Further, according to at least some example embodiments, in order to provide smooth coexistence between different modes/capabilities amongst UEs, an allocation rule may be such that the PRBs for both Mode 1 and Mode 2 must be allocated such that they occupy (at maximum) n sub-channels. For example, such a rule may mean that:

Mode 1: n*432 MHz BW capability can occupy at maximum n adjacent sub-channels.

Mode 2: n*400 MHz BW capability can occupy at maximum n adjacent sub-channels.

According to at least one example embodiment, the two modes/capabilities operate in a cell at the same time. In this case, PRBs of these two Modes can be aligned, such that, for example, common signals and channels are transmitted on the same locations, i.e. common PRBs of two Modes.

According to at least one example embodiment, with respect to carrier aggregation and BWP operation:

A UE can be configured with more than one cell/BWP; and

Each cell/BWP may follow one of the two predefined modes (i.e., Mode 1 and Mode 2).

FIG. 7 illustrates an example transmission (Tx) BW configuration for Mode 2. As is shown by table 700 of FIG. 7, according to at least some example embodiments, a number of PRBs is scaled from a reference number defined in Rel-15. In the considered example, the reference number is determined according to 120 kHz SCS, 400 MHz and it equals to 264 PRBs. The number of PRBs is selected such that the spectrum usage occupancy (i.e., with respect to an n*400 MHz BW) is fixed (95%). Furthermore, in this example, the maximum number of PRBs is limited to 275 (inline with NR Rel-15 assumptions).

According to at least some example embodiments, when determining the numerical values for GBs GB_b1 and GB_b2, the values shown in Table 6 (with respect to 120 kHz subcarrier spacing, and 400 MHz sub-channel BW) can be used as one starting point. Low or, alternatively, minimum guard bands GB_1 and GB_2 for Mode 2 (newly introduced channel bandwidths) can be tabulated, for example, in a way shown in Table 7. In Table 7, for wider bands of n*400 MHz, the GBs can be constructed according to principles from NR Rel-15, where the guard band first is doubled for a doubled BW and then slightly adjust by z, for example. According to at least some example embodiments, in case of carrier aggregation of multiple component carriers, each carrier must meet also the guard band sizes of the associated 432 MHz sub-channel.

TABLE 6

| SCS (kHz) | 50 MHz | 100 MHz | 200 MHz | 400 MHz |
|---|---|---|---|---|
| 60 | 1210 | 2450 | 4930 | N. A |
| 120 | 1900 | 2420 | 4900 | 9860 |

TABLE 7

| SCS (kHz) | 400 MHz | 800 MHz | 1200 MHz | 1600 MHz |
|---|---|---|---|---|
| 120 | 9860 (=X) | ~2X ± z1 | ~3X ± z2 | ~4X ± z3 |
| 240 | X ± z4 | ~2X ± z5 | . . . | |
| 480 | | | | |
| 960 | | | | |
| 1920 | | | | |

According to at least some example embodiments, in Mode 2, the configured carrier must at the same time comply also with the minimum GBs (GB_b1, GB_b2). The motivation is to place the n*400 MHz carrier in the center (enough) of the associated n*432 sub-channel. Enforced centering may have some tolerance e.g. to enable alignment of PRB grid between n*400 and n*432 carrier within the associated n*432 sub-band(s).

According to at least some example embodiments, with respect to Mode 1 operation, the guard bands GB_1 and GB_2 may tabulated as shown in FIG. 8. FIG. 8 illustrates an example Tx BW configuration for Mode 1. For example, Table 800 in FIG. 8 shows an example Tx BW configuration for Mode 1 for Tx BW configuration of n*432 MHz sub-channels.

According to at least some example embodiments, GB sizes may very between SCSs for the same band. According to at least some example embodiments, the calculation represented by table 800 assumes that a maximum number of PRBs is limited to 275 for any combination of SCS and the number of sub-bands (channels) n. Two examples of signaling used to support Mode 1 UEs and Mode 2 UEs on the 60 GHz band will now be discussed below.

Signaling Example 1

According to at least some example embodiments, when a gNB operates with a mixture of UEs (i.e., some UEs supporting only n*400 MHz and other UE supporting only n*432 channel BW), the UEs are informed using system information broadcast (e.g. SIB1) about the 400 MHz carrier only, including the associated guard bands. According to at least some example embodiments, UE's camping and initial access procedures are performed within the BWP smaller than nominal channel BW of 400 MHz. Later on, UEs with capability of receiving/transmitting on n*432 carriers (or sub-channels or BWPs) may be configured with a wider, UE-specific carrier (e.g. having a BW of 432 MHz). According to at least some example embodiments, the reference (starting) point of the PRB grid, i.e. point A, may be the same on this carrier as on the 400 MHz carrier, but the first usable PRB and the channel BW is different. Point A refers to a common reference point for resource block grids such as different BWPs and/or different carriers. For UEs capable of using 432 MHz, an additional offset of the carrier from the 400 MHz carrier can be signaled and point A may be assumed to be the same as for 400 MHz carrier. This avoids a need for additional configuration of UE-specific carrier to n*432 MHz UEs.

Signaling Example 2

According to at least some example embodiments, when a gNB operates with a mixture of UEs, some UEs supporting only n*400 MHz and other UEs only supporting n*432 channel BW, the UEs are informed in SIB1 about the 432 MHz carrier only. The UEs supporting a BW smaller than the one broadcasted in SIB1, determine the first usable PRB as the first usable PRB meeting the GB_b1 for the channel BW and SCS (while 432-MHz capable UEs assume the first usable PRB is the one meeting GB_1). According to at least one example embodiment, the gNB will refrain from using PRBs in GB_a1 and GB_a2 for system information broadcast, as well as dedicated transmissions to/from a UE, unless the gNB is certain that the UE is capable of using a 432 MHz carrier instead of only 400 MHz. This enables operation of two types of UEs, and smooth transition from n*400 Mhz to n*432 operation (more spectrum efficient) in the future for gNB. This operation does not require any additional signaling for determination of 400 MHz carrier placement.

Accordingly, by using operation modes Mode 1 and Mode 2 to implement NR on the unlicensed 60 GHz band, significant or, alternatively, maximal usage of benefits provided by sub-channelization; a smooth 60 GHz evolution path exists based on FR2; increased or, alternatively, maximal reuse of building blocks made in RF2 (especially when using subcarrier spacing 120 kHz).

Further, it should be noted that due to effective isotropic radiated power (EIRP) rules involved in 60 GHz unlicensed band, narrowband operation is quite attractive to reach a reasonable cell coverage. Additionally, it can provide a smooth evolution path based on existing FR2 design: e.g. first 400 MHz, then CA based on n*400 MHz, and finally wideband operation using m*432 MHz.

Furthermore, the proposed sub-channelization may also reduce complexity of cell search as it may limit (e.g., reduce) the allocation possibilities for synchronization signal block (SSB). For example, locations overlapping with in-band guards may be excluded from the set of allowed SSB frequency domain positions.

Example methods for implementing the above-referenced technical solutions according to at least some example embodiments will now be discussed below.

6. Example Methods of Operating a UE or gNB

Figure 9:
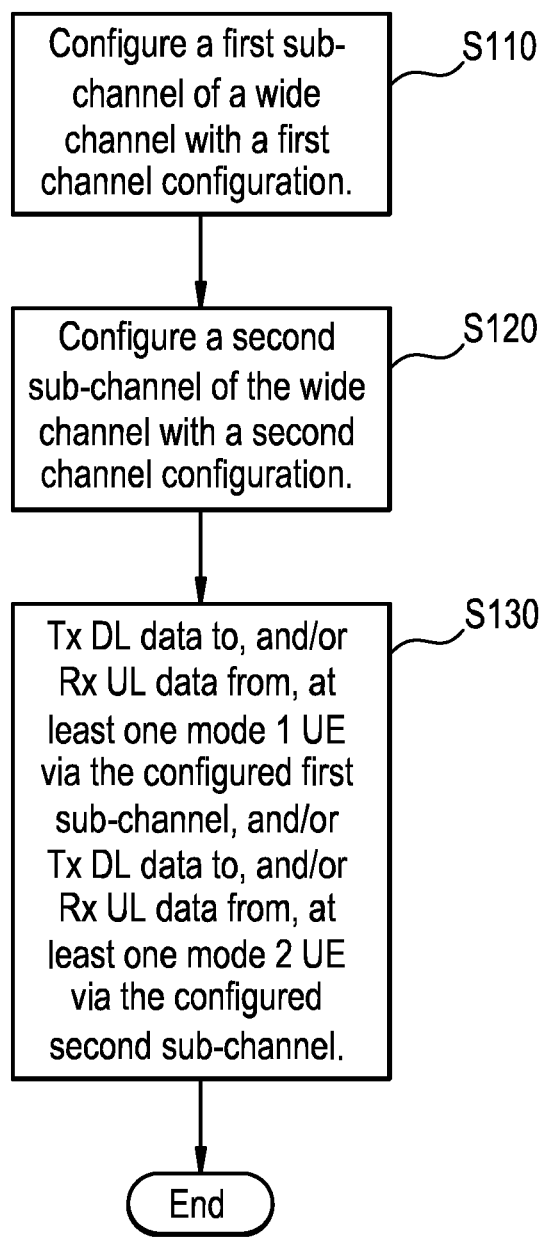
FIG. 9 is a flowchart illustrating an example method of operating a g Node B (gNB) to provide wireless communications support for UEs having different capabilities with respect to operation mode.
Figure 10:
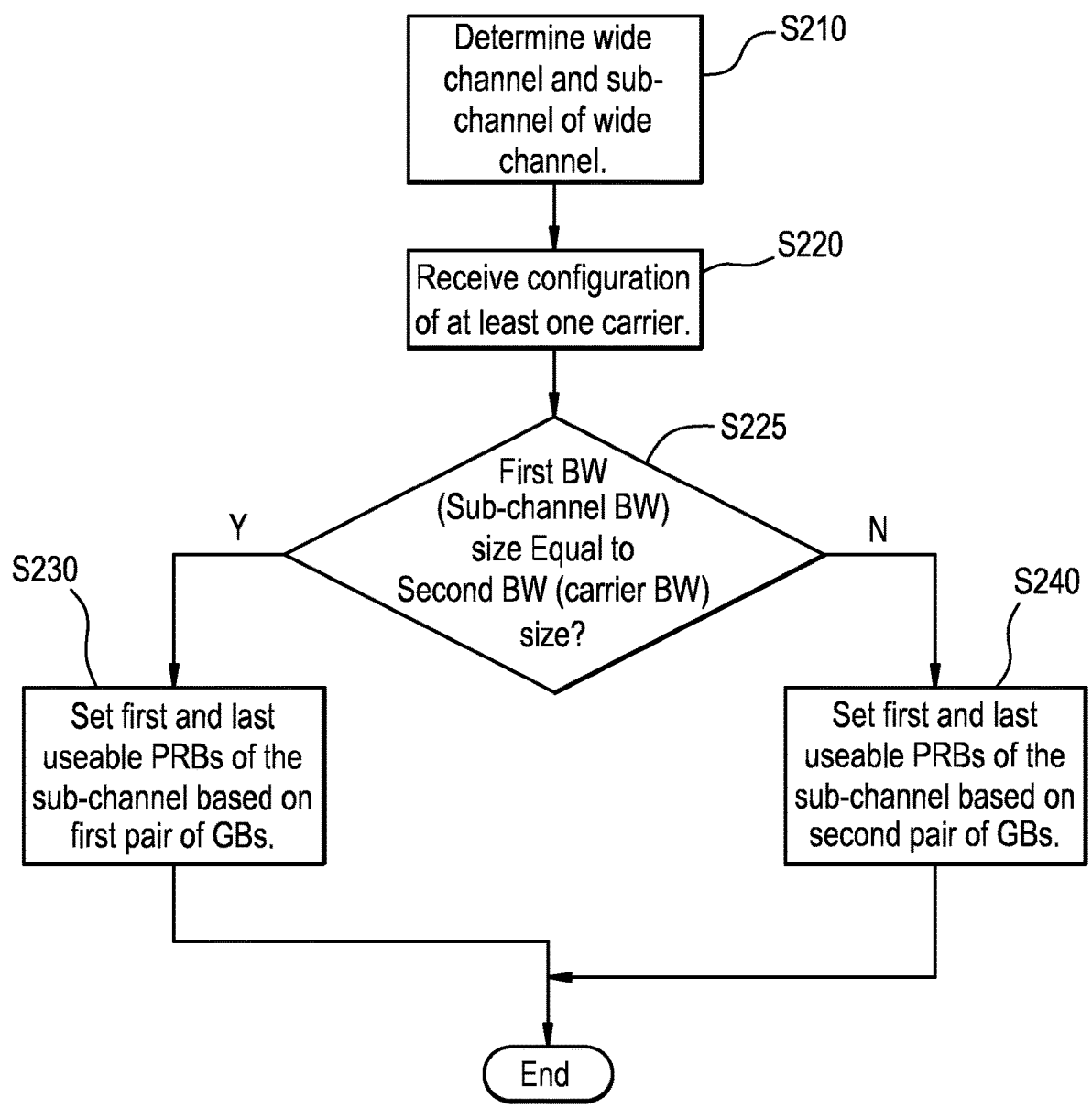
FIG. 10 is a flowchart illustrating an example method of operating a g Node B (gNB) to provide wireless communications support for UEs having different capabilities with respect to operation mode.

Example methods of operating a UE gNB a UE according to at least some example embodiments are discussed below with reference to FIGS. 9 and 10, as well as gNB 120, first UE 110A and second UE 110B of the communications network 100 illustrated in FIG. 1. FIGS. 9 and 10 are explained with reference to example scenarios in which the first UE 110A is a Mode 1 UE and the second UE 110B is a Mode 2 UE.

FIG. 9 is a flowchart illustrating an example method of operating a g Node B (gNB) to provide wireless communications support for UEs having different capabilities with respect to operation mode.

Referring to FIG. 9, in step S110, the gNB 120 configures a first sub-channel of a wide channel with a first configuration. For example, in step 110, the gNB 120 may configure a sub-channel of the 2.16 GHz wide 60 GHz band as a 432 MHz Mode 1 sub-channel or an n*432 MHz Mode 1 sub-channel (where n is a positive integer), as is discussed above with reference to Mode 1 configuration 610 of FIG. 6 and the parameters of Table 800 of FIG. 8. Configuration may involve at least one of broadcasted higher layer signaling (e.g. system information) and dedicated higher layer signaling.

In step S120, the gNB 120 configures a second sub-channel of a wide channel with a second configuration. For example, in step 120, the gNB 120 may configure a second sub-channel of the 2.16 GHz wide 60 GHz band as a 400 MHz Mode 2 sub-channel or an n*400 MHz Mode 2 sub-channel (where n is a positive integer), as is discussed above with reference to Mode 2 configuration 620 of FIG. 6 and the parameters of Table 700 of FIG. 7. Configuration may involve at least one of broadcasted higher layer signaling (e.g. system information) and dedicated higher layer signaling.

In step 130, the gNB 110 performs one or more of
transmitting DL data to at least the first UE 110A using at least the first sub-channel,
receiving UL data from at least the first UE 110A using at least the first sub-channel,
transmitting DL data to at least the second UE 110B using at least the second sub-channel, or
transmitting UL data to at least the second UE 110B using at least the second sub-channel.

Referring to step S110~S130, the first sub-channel is a Mode 1 sub-channel and the second channel is a Mode 2 sub-channel. Further, as is illustrated with respect to Mode 1 configuration 610 and Mode 2 configuration 620 of FIG. 6, the first channel configuration (which is a Mode 1 configuration) may include a first plurality of physical resource blocks (PRBs) between a first guard band (GB) (e.g., GB_1 of FIG. 6) and a second GB (e.g., GB_2 of FIG. 6), and the second channel configuration (which is a Mode 2 configuration) may include a second plurality of PRBs between a third GB (e.g., GB_b1) and a fourth GB (e.g., GB_b2).

Further, as is also illustrated with respect to Mode 1 configuration 610 and Mode 2 configuration 620 of FIG. 6, a total number of PRBs (e.g., available PRBs, which are PRBs between the GBs) in the second plurality of PRBs may be less than a total number of PRBs (e.g., available PRBs, which are PRBs between the GBs) in the first plurality of PRBs, and each PRB in the second plurality of PRBs may be aligned with a corresponding PRB in the first plurality of PRBs with respect to frequency. For example, referring to FIG. 6, the PRBs between GB_b1 and GB_b2 (i.e., the second plurality of PRBs) are fewer in number than the PRBs between GB_1 and GB_2 (i.e., the first plurality of PRBs). An example method of operating a UE in accordance with at least some example embodiments will now be discussed with reference to FIG. 10.

FIG. 10 is a flowchart illustrating an example method of operating a g Node B (gNB) to provide wireless communications support for UEs having different capabilities with respect to operation mode.

Referring to FIG. 10, in step S210, the UE determines a wide channel and a sub-channel of the wide channel. For example, in step S210, a Mode 1 UE (e.g., first UE 110A) may determine the 2.16 GHz wide 60 GHz band as the determined wide channel, and determine a 432 MHz channel (or n*432 MHz channel, where n is a positive integer) as the determined sub-channel of the wide channel, because Mode 1 UEs are capable of using n*432 MHz channels. As another example, in step S210, a Mode 2 UE (e.g., second UE 110B) may determine the 2.16 GHz wide 60 GHz band as the determined wide channel, and determine a 400 MHz BW channel (or n*432 MHz BW channel, where n is a positive integer) as the determined sub-channel of the wide channel, because Mode 2 UEs are capable of using n*400 MHz BW channels.

In Step 220, the UE receives a configuration of at least one carrier. For example, according to at least one example embodiment, the gNB 110 may send a configuration of at least one carrier to at least one UE of communications network 100. According to at least some example embodiments, the gNB 110 may broadcast a system information block (SIB) (e.g., a type 1 SIB (SIB1)) that identifies a BW of one or more carriers of the 2.16 GHz wide 60 GHz band.

For the purpose of simplicity, FIG. 10 is explained with respect to an example scenario in which the information block identifies one or more carriers as 432 MHz BW carriers or n*432 MHz BW carriers (where n is a positive integer), in accordance with operation Mode 1). However, at least some example embodiments are not limited to this example scenario. For example, the information block may identify one or more carriers as 400 MHz carriers or n*400 MHz BW carriers (where n is a positive integer), in accordance with operation Mode 2.

Accordingly, in step 220, the UE (e.g., first UE 110A or second UE 110B) receives information from the gNB 110 that allows the UE to determine a size of a BW of one or more carriers which the gNB will use to transmit DL data to, or receive UL data from, the UE.

In Step S225, the UE (e.g., first UE 110A or second UE 110B), determines whether a size of a first BW is equal to a size of a second BW, where the first BW is the BW of the sub-channel determined by the UE in step S210 and the second BW is the BW identified by the configuration of the at least one carrier which the UE received in step S220.

If the UE (e.g., first UE 110A or second UE 110B) determines, in step 225, that the first and second BWs are equal in size, the UE proceeds to step S230.

In step S230, the UE (e.g., first UE 110A or second UE 110B) sets the first and last usable PRBs of the sub-channel based on a first pair of GBs. The first pair of GBs are GBs corresponding to operation Mode 1. For example, in FIG. 6, GBs GB_1 and GB_2 are an example of the first pair of GBs. After step S230, the method of FIG. 10 ends. According to at least some example embodiments, the UE (e.g., first UE 110A or second UE 110B) receives information indicating the first pair of GBs from the gNB 110.

Alternatively, if the UE (e.g., first UE 110A or second UE 110B) determines, in step 225, that the first and second BWs are not equal in size, the UE proceeds to step S240.

In step S240, the UE sets the first and last usable PRBs of the sub-channel based on a second pair of GBs. The second pair of GBs are GBs corresponding to operation Mode 2. For example, in FIG. 6, GBs GB_b1 and GB_b2 are an example of the second pair of GBs. Afterwards, the method of FIG. 10 ends. According to at least some example embodiments, the UE (e.g., first UE 110A or second UE 110B) receives information indicating the second pair of GBs (e.g., GB_b1 and GB_b2) from the gNB 110. Further, according to at least some example embodiments, the UE (e.g., first UE 110A or second UE 110B) may receive information indicating a third pair of GBs. For example, in FIG. 6, GBs GB_a1 and GB_a2 are an example of the third pair of GBs.

Referring, again, to steps S225-S240, in an example scenario where the UE is the first UE 110A, the first BW of the sub-channel determined by the first UE 110A in step S210 will be 432 MHz (or n*432 MHz where n is a positive integer), because the first UE 110A is a Mode 1 UE. Further, as is discussed above, the second BW of the carrier configuration received in Step 220 is also 432 MHz (or n*432 MHz where n is a positive integer). Thus, the first UE 110A determines, in step S225, the first and second BWs are equal in size (i.e., S225:"Y"), and the first UE 110A proceeds to step S230. In step S230, the first UE 110A sets first and last usable PRBs of the sub-channel determined in step S210 based on a first pair of GBs (e.g., GB_1 and GB_2 of FIG. 6). For example, the first UE 110A could set the PRB immediately following GB_1 in FIG. 6 as the first usable PRB of the sub-channel determined in step S210 and the first UE 110A could set the PRB immediately preceding GB_2 in FIG. 6 as the last usable PRB of the sub-channel determined in step S210.

Alternatively, in an example scenario where the UE is the second UE 110B, the first BW of the sub-channel determined by the second UE 110B in step S210 will be 400 MHz (or n*400 MHz where n is a positive integer), because the second UE 110B is a Mode 2 UE. Further, as is discussed above, the second BW of the carrier configuration received in Step 220 is 432 MHz (or n*432 MHz where n is a positive integer). Thus, the second UE 110B determines, in step S225, the first and second BWs are not equal in size (i.e., S225:"N"), and the second UE 110B proceeds to step S240. In step S240, the second UE 110B sets first and last usable PRBs of the sub-channel determined in step S210 based on a second pair of GBs (e.g., GB_b1 and GB_b2 of FIG. 6). For example, the second UE 110B could set the PRB immediately following GB_b1 in FIG. 6 as the first usable PRB of the sub-channel determined in step S210 and the second UE 110B could set the PRB immediately preceding GB_b2 in FIG. 6 as the last usable PRB of the sub-channel determined in step S210.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided above to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing UE, base stations, eNBs, RRHs, gNBs, femto base stations, network controllers, computers, Central Units (CUs), ng-eNBs, other radio access or backhaul network elements, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically.

Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, UEs, base stations, eNBs, RRHs, gNBs, femto base stations, network controllers, computers, Central Units (CUs), ng-eNBs, other radio access or backhaul network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A user equipment (UE) comprising:
a processor; and
memory storing computer-executable instructions that, when executed by the processor, causes the UE to at least:
determine a wide channel;
determine at least one sub-channel within the wide channel, a channel bandwidth (BW) of the at least one sub-channel being a first BW;
receive a configuration of at least one downlink (DL) or uplink (UL) carrier, a channel BW of the at least one carrier being a second BW;
determine a first and last usable physical resource block (PRBs) of the at least one sub-channel based on the first BW and the second BW by
setting first and last useable PRBs of the at least one sub-channel based on a first pair of guard bands (GBs), if a size of the second BW is equal to a size of the first BW, and
setting the first and last useable PRBs of the at least one sub-channel based on a second pair of GBs, if the size of a second BW is less than the size of the first BW, a size of a total bandwidth of the second pair of GBs being greater than a size of a total bandwidth of the first pair of GBs; and
perform at least one of transmitting data to, or receiving data from, a network element via the at least one DL carrier or UL carrier.

2. The UE of claim 1, wherein a size of a BW of the wide channel is 2.16 GHz.

3. The UE of claim 1, wherein the size of the first BW is n*432 MHz, wherein n is an integer $\geq 1$.

4. The UE of claim 1, wherein a total number of sub-channels included in the wide channel is five.

5. The UE of claim 1, wherein the size of the second BW is at least one of 100 MHz and n*400 MHz wherein n is an integer $\geq 1$.

6. The UE of claim 1, wherein the UE further caused to:
obtain a third pair of guard bands (GBs) and determine a maximum number of PRBs of the at least one DL or UL carrier based on the third pair of guard bands.

7. The UE of claim 1, wherein the second BW is n*432 MHz or n*400 MHZ, wherein n is an integer $\geq 1$, and the at least one carrier occupies at maximum n adjacent sub-channels.

8. The UE of claim 7, wherein the UE supports at least two contiguous carriers and each carrier is confined within n adjacent sub-channels.

9. The UE of claim 1, wherein the UE is capable of operating according to both the first pair and the second pair of GBs, and wherein the UE further caused to:
perform an initial access according to the second pair of GBs; and
subsequent to the initial access, receive a radio resource control message from the base station to start operating according to the first pair of GBs.

10. The UE of claim 1, wherein the UE is capable of operating according to only the second pair of GBs, and wherein the UE further caused to:
determine the first usable PRB based on a received system information block broadcast.

11. A base station comprising:
a processor; and
memory storing computer-executable instructions that, when executed by the processor, cause the base station:
configure at least a first sub-channel, from among sub-channels of a wide channel, with a first channel configuration for at least one of transmitting downlink (DL) data to, or receiving uplink (UL) data from, at least a first UE configured to operate in a first mode;
configure at least a second sub-channel, from among the sub-channels of the wide channel, with a second channel configuration for at least one of transmitting DL data to, or receiving UL data from, at least a second UE configured to operate in a second mode; and
perform at least one of:
transmit DL data to at least the first UE using at least the first sub-channel,
receive UL data from at least the first UE using at least the first sub-channel,
transmit DL data to at least the second UE using at least the second sub-channel, or
transmit UL data to at least the second UE using at least the second sub-channel,
wherein,
the first channel configuration includes a first plurality of physical resource blocks (PRBs) between a first guard band (GB) and a second GB,
the second channel configuration includes a second plurality of PRBs between a third GB and a fourth GB,
a total number of PRBs in the second plurality of PRBs is less than a total number of PRBs in the first plurality of PRBs, and each PRB in the second plurality of PRBs is aligned with a corresponding PRB in the first plurality of PRBs with respect to frequency.

12. The base station of claim 11, wherein a size of a bandwidth of the wide channel is 2.16 GHz.

13. The base station of claim 11, wherein a size of a bandwidth of the first sub-channel is 432 MHz.

14. The base station of claim 11, wherein a total number of sub-channels included in the wide channel is five.

15. The base station of claim 11, wherein a size of a bandwidth of the second sub-channel is at least one of 100 MHz and 400 MHz.

16. The base station of claim 11, wherein the base station supports at least first and second carriers and the first and second carriers are confined to the first and second sub-channels.

17. The base station of claim 16, wherein the at least first and second carriers operate according to a common PRB grid.

18. A method of operating a user equipment (UE), the method comprising:
    determining a wide channel;
    determining at least one sub-channel within the wide channel, a channel bandwidth (BW) of the at least one sub-channel being a first BW;
    receiving a configuration of at least one DL or UL carrier, a channel BW of the at least one carrier being a second BW;
    determining a first and last usable physical resource block (PRB) of the at least one sub-channel based on the first BW and the second BW by
        setting first and last useable physical resource blocks (PRBs) of the at least one sub-channel based on a first pair of GBs, if a size of the second BW is equal to a size of the first BW, and
        setting the first and last useable PRBs of the at least one sub-channel based on a second pair of GBs, if the size of a second BW is less than the size of the first BW, a size of a total bandwidth of the second pair of GBs being greater than a size of a total bandwidth of the first pair of GBs; and
    performing at least one of transmitting data to, or receiving data from, a base station via the at least one DL carrier or UL carrier, using the at least one sub-channel.

19. The method of claim 18, further comprising:
    Obtaining a third pair of guard bands (GBs) and determine a maximum number of PRBs of the at least one DL or UL carrier based on the third pair of guard bands.

20. The method of claim 18, wherein the UE is capable of operating according to both the first pair and the second pair of GBs, and the method further comprising:
    performing an initial access according to the second pair of GBs; and
    subsequent to the initial access, receiving a radio resource control message from the base station to start operating according to the first pair of GBs.

* * * * *